United States Patent
Lin et al.

(10) Patent No.: US 8,922,148 B2
(45) Date of Patent: Dec. 30, 2014

(54) MOTOR AND CONTROL METHOD THEREOF

(71) Applicant: Delta Electronics, Inc., Taoyuan Hsien (TW)

(72) Inventors: Yu-Liang Lin, Taoyuan Hsien (TW); Kun-Fu Chuang, Taoyuan Hsien (TW); Cheng-Chieh Liu, Taoyuan Hsien (TW)

(73) Assignee: Delta Electronics, Inc., Kuei San, Taoyuan Hsien (TW)

( * ) Notice: Subject to any disclaimer, the term of this patent is extended or adjusted under 35 U.S.C. 154(b) by 195 days.

(21) Appl. No.: 13/708,702

(22) Filed: Dec. 7, 2012

(65) Prior Publication Data

US 2014/0021891 A1 Jan. 23, 2014

(30) Foreign Application Priority Data

Jul. 19, 2012 (CN) .......................... 2012 1 0251043

(51) Int. Cl.
*H02K 29/08* (2006.01)
*H02P 6/16* (2006.01)
*H02P 6/00* (2006.01)
*H02P 6/10* (2006.01)

(52) U.S. Cl.
CPC ...... *H02P 6/16* (2013.01); *H02P 6/008* (2013.01); *H02P 6/10* (2013.01)
USPC .............. 318/400.38; 318/400.01; 318/400.3; 318/568.22; 363/88; 363/114; 363/125; 327/303; 327/307; 327/330; 327/343; 327/428; 360/29; 360/112

(58) Field of Classification Search
CPC ........................................................ H02P 6/16
USPC ..................... 318/400.01, 568.22, 400.3, 701, 318/400.37, 400.38; 360/29, 112; 74/562.5; 327/303, 307, 330, 343, 428, 531; 363/88, 114, 125; 324/87, 119
See application file for complete search history.

(56) References Cited

U.S. PATENT DOCUMENTS 6,452,349 B1 * 9/2002 Hahn et al. ............... 318/400.22

* cited by examiner

*Primary Examiner* — Antony M Paul
(74) *Attorney, Agent, or Firm* — Muncy, Geissler, Olds & Lowe, P.C.

(57) ABSTRACT

A motor includes a rotor, a sensor unit, an offset unit, a rectification unit and a modulating unit. The sensor unit outputs a first signal in accordance with a magnetic field variation of the rotor. The offset unit is coupled to the sensor unit, and outputs a second signal in accordance with the first signal. The rectification unit is coupled to the offset unit, and outputs a third signal in accordance with the second signal. The modulating unit is coupled to the rectification unit, and outputs a control signal in accordance with a result by comparing the third signal with a periodic signal. The modulating unit controls a reverse rotation of the rotor smoothly in accordance with the control signal. A control method of the motor is also disclosed.

20 Claims, 6 Drawing Sheets

MOTOR AND CONTROL METHOD THEREOF

CROSS REFERENCE TO RELATED APPLICATIONS

This Non-provisional application claims priority under 35 U.S.C. §119(a) on Patent Application No(s). 201210251043.8 filed in People's Republic of China on Jul. 19, 2012, the entire contents of which are hereby incorporated by reference.

BACKGROUND OF THE INVENTION

1. Field of Invention

The invention relates to a motor and a control method thereof, and in particular, to a low vibration motor and a control method thereof.

2. Related Art

Due to the feature of brushless, a single-phase motor has a size more compact than a brush motor and a structure simpler than a three-phase motor. The price of the single-phase motor is also relatively cheaper. Therefore, single-phase motors are widely used to dissipate heat generated by electronic devices such as central processing units (CPU) or hard disc drives which have small sizes and limited internal spaces. However, since such electronic devices are very precise, the vibrations they can sustain are very limited.

During the rotation of a motor, vibrations are generated accordingly. Both the radial and axial vibrations can cause damages or errors to the electronic devices if they are too heavy. Therefore, when a single-phase brushless motor is applied to such an electronic device, it is desired to reduce the vibrations of the motor and the electronic device.

SUMMARY OF THE INVENTION

In view of the foregoing subject, an objective of the invention is to provide a motor and a control method thereof to reduce the vibration of the motor itself to avoid the damages or errors of a precise electronic device and to further improve the quality of the whole electronic device.

To achieve the above objective, the present invention discloses a motor including a rotor, a sensor unit, an offset unit, a rectification unit and a modulating unit. The sensor unit outputs a first signal in accordance with a magnetic field variation of the rotor. The offset unit is coupled to the sensor unit, and outputs a second signal in accordance with the first signal. The rectification unit is coupled to the offset unit, and outputs a third signal in accordance with the second signal. The modulating unit is coupled to the rectification unit, and outputs a control signal in accordance with a result by comparing the third signal with a periodic signal. The modulating unit controls a reverse rotation of the rotor smoothly in accordance with the control signal In one embodiment, the waveform of the periodic signal is a triangular wave or a square wave.

In one embodiment, the control signal is a pulse width modulation (PWM) signal.

In one embodiment, the absolute values of a positive level and a negative level of the second signal are substantially the same.

In one embodiment, a magnetization waveform of the rotor is substantially a sine wave.

To achieve the above objective, the present invention also discloses a control method of a motor. The control method includes the following steps of: providing a motor, wherein the motor includes a rotor, a sensor unit, an offset unit, a rectification unit and a modulating unit; outputting a first signal by the sensor unit according to a magnetic field variation of the rotor; adjusting a positive level and a negative level of the first signal by the offset unit to output a second signal; full-wave rectifying the second signal by the rectification unit to output a third signal; outputting a control signal by the modulating unit according to the result of comparing the third signal with a periodic signal; and controlling the rotor by the modulating unit according to the control signal whereby a rotation is reversed more smoothly.

In one embodiment, the absolute values of a positive level and a negative level of the second signal are substantially the same.

In one embodiment, the offset unit adjusts and fixes absolute values of the positive level and the negative level of the second signal at a specific level value.

In one embodiment, the control signal is a pulse width modulation (PWM) signal.

In one embodiment, the waveform of the periodic signal is a triangular wave or a square wave.

As mentioned above, the motor and control method of the invention are to perform a modulation using the result of comparing the periodic signal with the signal obtained after offsetting and level adjusting the Hall signal, and the rotation of the rotor is controlled according to the outputted control signal. Therefore, the reverse of the rotation is smoother, and the vibration is reduced more effectively. The damages or error of the precise electronic apparatus can be avoided and the quality of the overall electronic apparatus can be improved.

BRIEF DESCRIPTION OF THE DRAWINGS

The present invention will become more fully understood from the subsequent detailed description and accompanying drawings, which are given by way of illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

Figure 1:
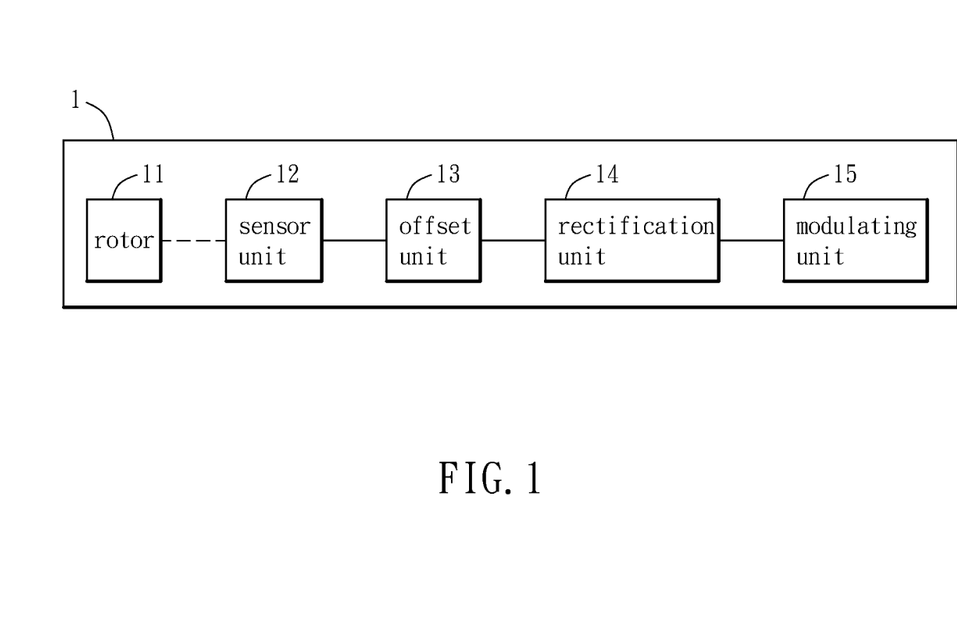
FIG. 1 is a circuit block diagram showing a circuit for controlling the magnetization of a motor according to a preferred embodiment of the invention.

FIG. 1 is a circuit block diagram showing a circuit for controlling the magnetization of a motor according to a preferred embodiment of the invention. Referring to FIG. 1, the motor 1 includes a rotor 11, a sensor unit 12, an offset unit 13, a rectification unit 14 and a modulating unit 15.

The rotor 11 has a magnetization waveform. Specifically speaking, when manufacturing the rotor 11, a magnet of the rotor 11 is magnetized in a specific way to make the magnet become magnetized. The magnetization waveform is generated during magnetization.

The sensor unit 12 is, for example, a Hall sensor, which output a first signal according to a magnetic field variation (e.g. the magnetic flux variation) of the rotor 11, to obtain the rotation status of the rotor 1. The first signal is, for example, a Hall signal. In more detailed, the first signal is generated by transforming the magnetic flux variation into a voltage or current variation.

The offset unit 13 is coupled with the sensor unit 12, and outputs a second signal according to the first signal outputted by the sensor unit 12. Specifically speaking, when the offset unit 13 receives the first signal, the offset unit checks whether the absolute values of the positive level and the negative level of the waveform of the first signal are the same. If not, the offset unit 13 adjusts the zero-level point of the waveform of the first signal so that the absolute values of the positive level and the negative level are substantially the same to output the second signal. In other words, the second signal is the first signal with the zero-level point of the waveform being adjusted via the offset unit 13, and the absolute values of the positive level and the negative level of the second signal are substantially the same.

It is preferred that the offset unit 13 not only adjusts the zero-level point of the waveform of the first signal so that the absolute values of the positive level and the negative level of the outputted second signal are substantially the same, but also further adjusts and fixes the absolute values of the positive level and the negative level of the outputted second signal at a specific level value. Specifically speaking, although the absolute values of the positive level and the negative level of the second signal are substantially the same, the level of the waveform may be unsmooth due to noises or other reasons, which indirectly results in the false determination during the subsequent signal processing. To prevent this from happening, the offset unit 13 adjusts and fixes the positive level and the negative level of the signal to specific level values to smooth the waveform of the second signal. In practical applications, the fore-mentioned specific level values may be in different designs according to needs, and the invention is not limited herein.

The rectification unit 14 is coupled to the offset unit 13 and output a third signal according to the second signal. Specifically speaking, when the rectification unit 14 receives the second signal outputted by the offset unit 13, the rectification unit 14 performs a full-wave rectification to the second signal to output the third signal. In other words, the third signal is the second signal after full-wave rectified by the rectification unit 14.

Figure 2A:
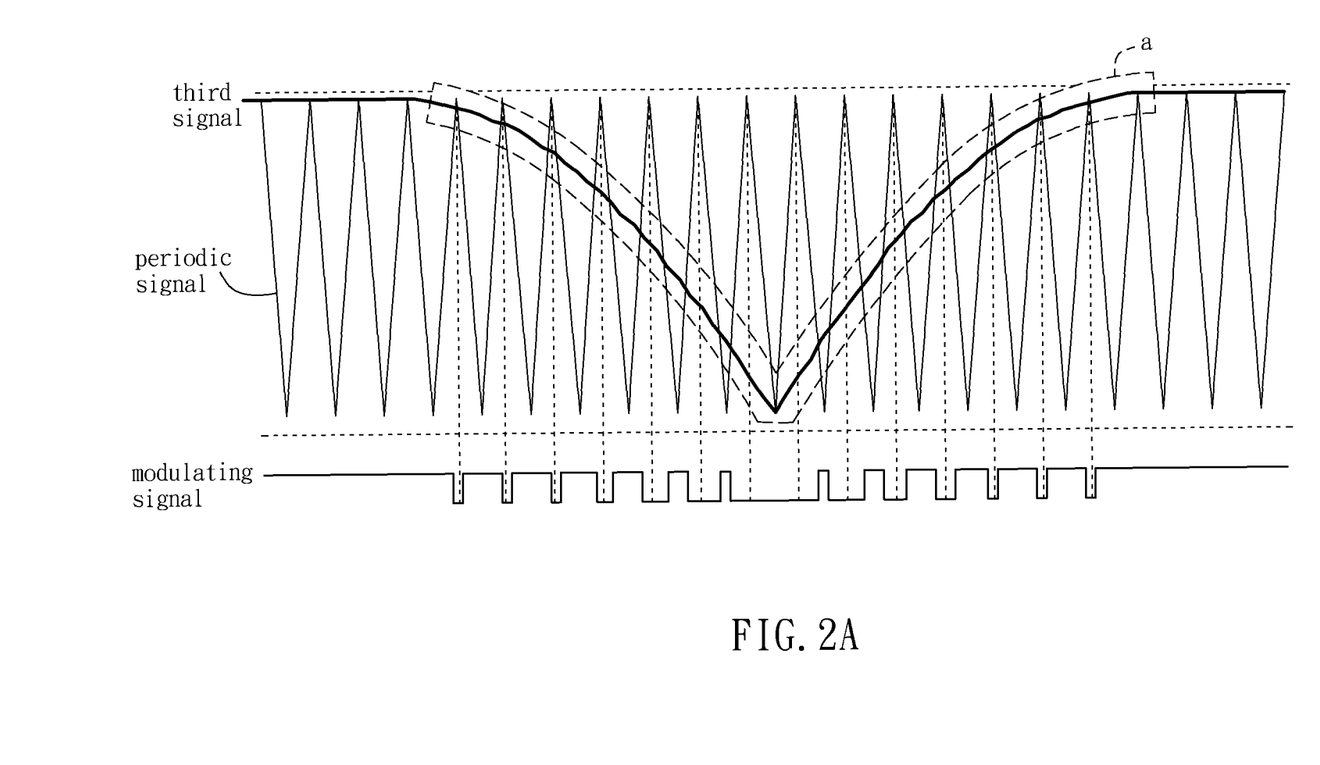
FIGS. 2A and 2B are schematic diagrams showing the comparison of the third signal with the periodic signal and the correspondingly outputted control signal.

The modulating unit 15 is coupled to the rectification unit 14 and outputs a control signal according to the result of comparing the third signal with a periodic signal. The modulating unit 15 controls the rotor 11 to perform a reverse rotation according to the control signal. The detailed explanation will be described hereinafter with reference to FIGS. 2A and 2B, which are schematic diagrams showing the comparison of the third signal with the periodic signal and the correspondingly outputted control signal. In the present embodiment, the waveform of the periodic signal is a triangular wave. The modulating unit 15 compares the third signal with the periodic signal when receiving the third signal. As shown in FIG. 2A, at the slant region a of the waveform of the third signal, the voltage values of the waveform of the third signal are smaller than the corresponding waveform of the periodic signal at some portions. Then referring to the corresponding waveform of the control signal outputted by the modulating unit 15 at the bottom, at these portions the levels of the modulating signal are low levels (Low), while in other portions the levels are high levels (High).

In other words, in the present embodiment, the control signal is a pulse width modulation signal. When the voltage value of the waveform of the third signal is smaller than the voltage value of the waveform of the periodic signal, the modulating unit 15 outputs a low level, and when the voltage value of the waveform of the third signal is equal to or larger than the voltage value of the waveform of the periodic signal, the modulating unit 15 outputs a high level. Subsequently, the modulating unit 15 controls the rotor 11 to perform a reverse rotation according to the control signal.

Figure 2B:
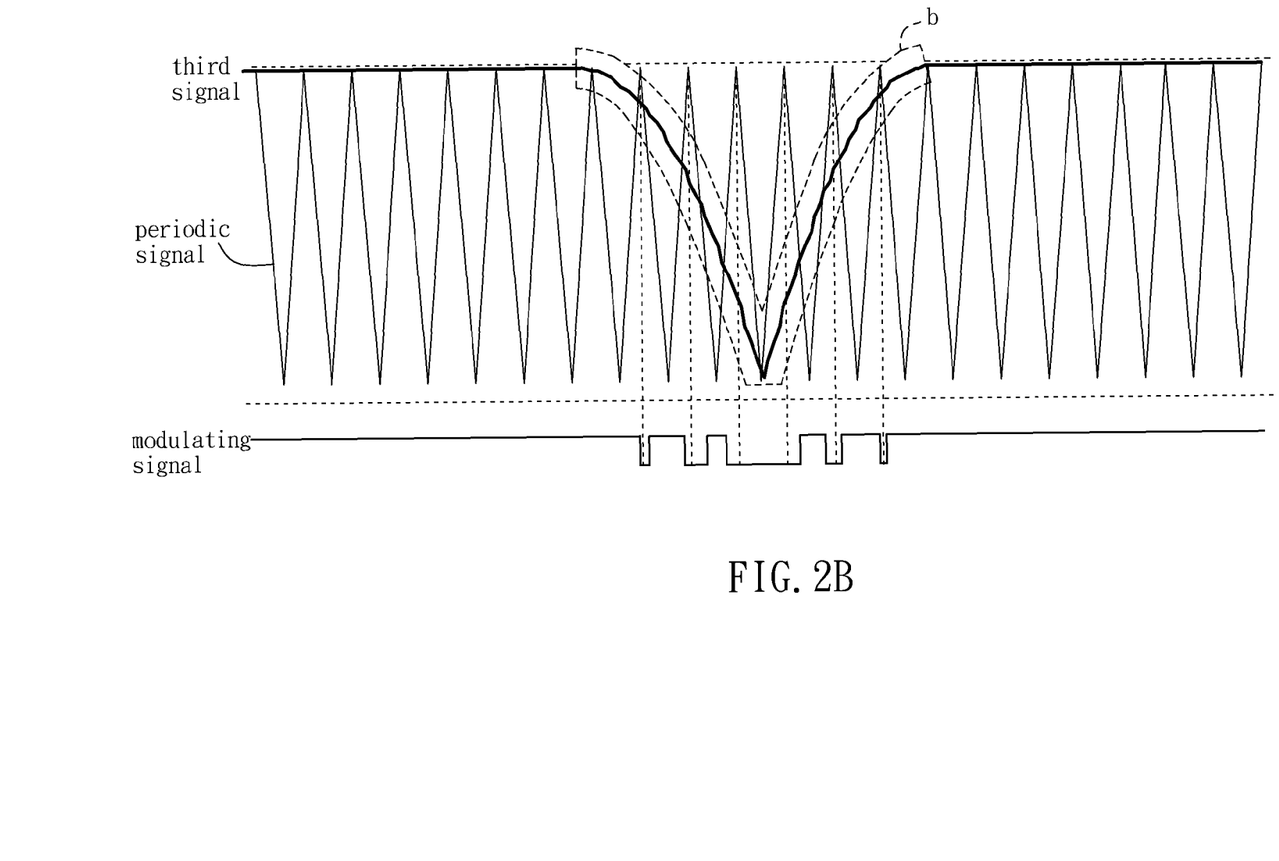

Then referring to FIG. 2B, at the slant region b of the waveform of the third signal, the slope of the waveform of the third signal is larger than that of the region a in FIG. 2A. Therefore the portions that voltage value of the waveform of the third signal is smaller than the voltage value of the waveform of the periodic signal is fewer, and the low-level regions of the control signal correspondingly outputted by the modulating unit 15 is fewer. In other words, when the slope of the slant region of the waveform of the third signal is larger, the soft-switching time for the modulating unit 15 to control the rotor 11 is longer, and vice versa.

It should be noted that although in the present embodiment the waveform of the periodic signal is a triangular wave, in actual practice the waveform of the periodic signal may also be a square wave.

It should be noted that although in the present embodiment the sensor unit 12, the offset unit 13, the rectification unit 14 and the modulating unit 15 are units disposed independently to each other, in practical applications one or more integrated chips may be used to integrate two or more functions of the sensor unit 12, the offset unit 13, the rectification unit 14 and the modulating unit 15. For example, the sensor unit 11 and the modulating unit 15 are independently disposed, while the offset unit 13 and the rectification unit 14 are integrated in an integrated chip. Therefore the invention is not limited herein.

Figure 3A:
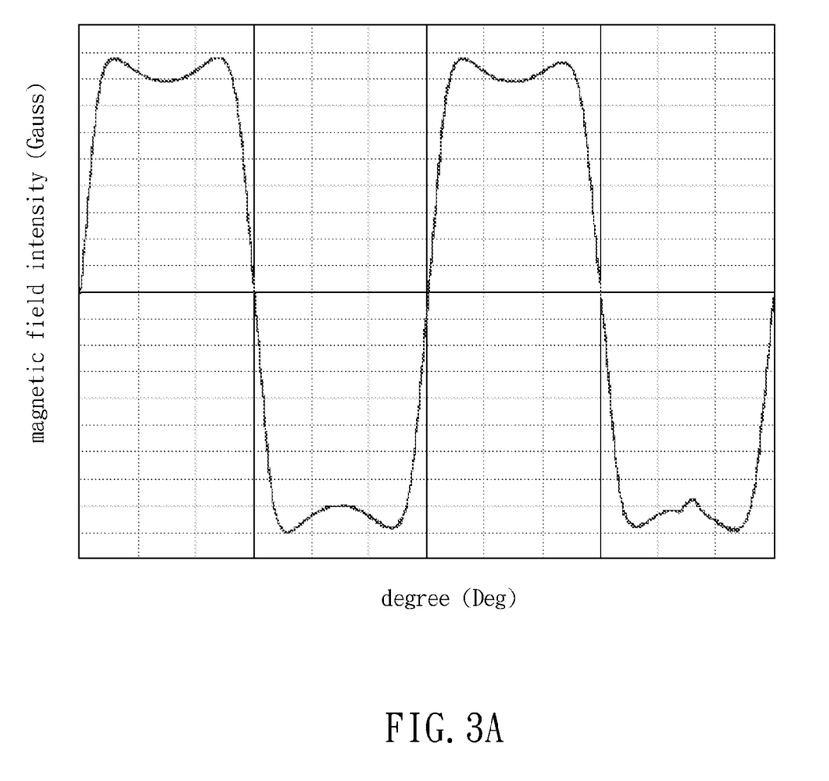
FIGS. 3A and 3B are schematic diagrams showing the waveform of the first signal.
Figure 3B:
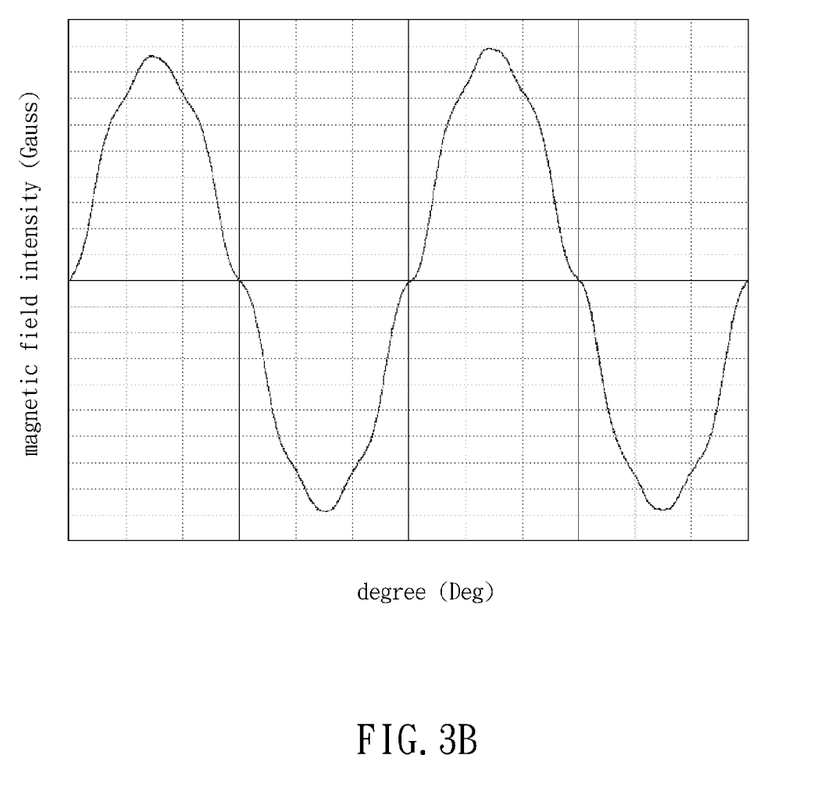

It is preferable that the magnetization waveform of the rotor 11 is substantially a sine wave. Please refer to FIGS. 3A and 3B, which are the waveform diagrams of the first signal, wherein the horizontal axis is the degree (Deg.) and the vertical axis is the intensity of the magnetic field (Gauss). Since the first signal is the voltage or current signal transformed from the response of the magnetic field of the rotor, the magnetization waveform of the rotor can be obtained via the waveform of the first signal. The first signal shown in FIG. 3A is substantially a square wave, and the first signal shown in FIG. 3B is substantially a sine wave. In other words, the magnetization waveform of the rotor corresponding to the first signal shown in FIG. 3A is a square wave, and the magnetization waveform of the rotor corresponding to the first signal shown in FIG. 3B is a sine wave. Although the motor having a rotor magnetized by a magnetization waveform of a square wave and the aforementioned components can achieve the effect of vibration reduction, the degree of vibration reduction is not better than the motor having a rotor magnetized by a magnetization waveform of a sine wave and the aforementioned components. Therefore, to further reduce the vibration of the motor 1, the rotor 11 of the motor 1 has a magnetization waveform that is substantially a sine wave.

Figure 4:
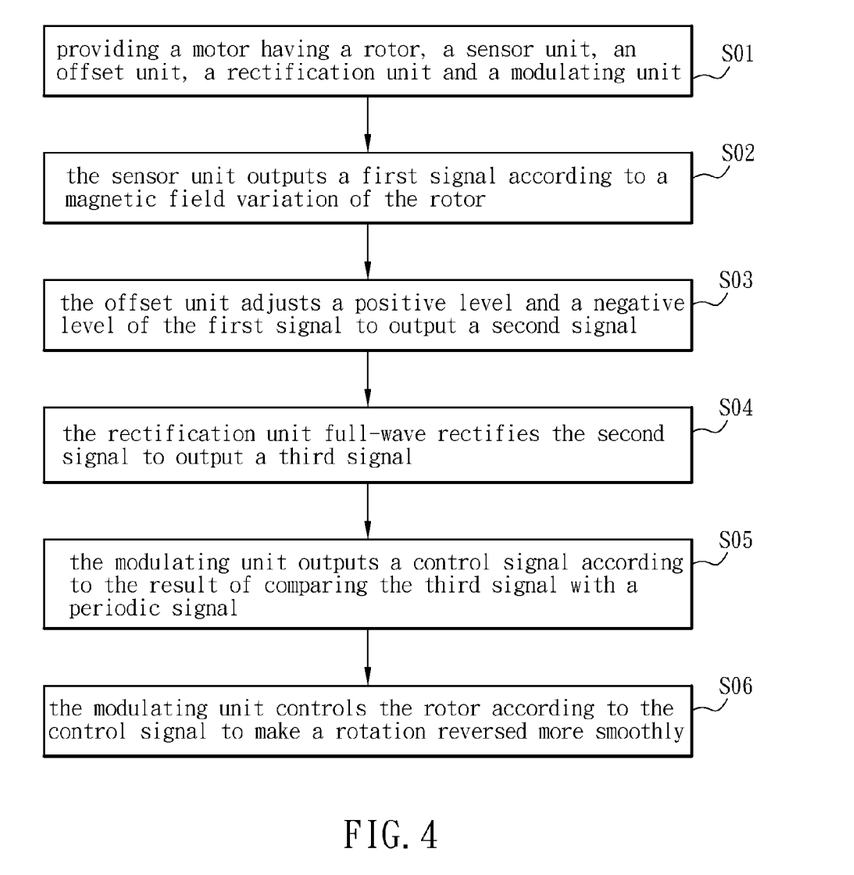
FIG. 4 is a flowchart showing the method of controlling the magnetization of a motor according to another preferred embodiment of the invention.

FIG. 4 is a flowchart of the method of controlling the magnetization of a motor according to another embodiment of the invention. Each of the steps of the method will be explained in detail hereinbelow.

In step S01, a motor is provided. The motor has a rotor, a sensor unit, an offset unit, a rectification unit and a modulating unit. The present embodiment is implemented in the motor 1 described above; therefore here and the following descriptions will be more comprehensive in view of FIG. 1.

In step S02, the sensor unit outputs a first signal according to the magnetic field variation of the rotor. The sensor unit may be, for example, a Hall sensor, which outputs a first signal such as a Hall signal according to the magnetic flux variation of the magnetic field of the rotor 1 to obtain the rotation status of the rotor.

In step S03, the offset unit adjusts the positive level and the negative level of the first signal to output a second signal. In detail, when the offset unit 13 receives the first signal, it checks whether the absolute values of the positive level and the negative level of the waveform of the first signal are the same. If not, the offset unit 13 adjusts the zero-level point of the waveform of the first signal so that the absolute values of the positive level and the negative level are substantially the same to output the second signal. In other words, the second signal is the first signal with the zero-level point of the waveform being adjusted via the offset unit 13, and the absolute values of the positive level and the negative level of the second signal are substantially the same.

It is preferred that the offset unit 13 not only adjusts the zero-level point of the waveform of the first signal to make the absolute values of the positive level and the negative level of the outputted second signal be substantially the same, but also adjusts and fixes the absolute values of the positive level and the negative level of the outputted second signal at a specific level value. Specifically speaking, although the absolute values of the positive level and the negative level of the second signal are substantially the same, the level of the waveform may be unsmooth due to noises or other reasons, which indirectly results in the false determination of subsequent signal processing. To prevent this from happening, the offset unit 13 adjusts and fixes the positive level and the negative level of the signal to specific level values to smooth the waveform of the second signal. In practical applications, the fore-mentioned specific level values may be in different designs according to needs, and the invention is not limited herein.

In step S04, the rectification unit full-wave rectifies the second signal to output a third signal. In detail, the rectification unit 14 performs a full-wave rectification to the second signal according to the second signal outputted by the offset unit 13 to output the third signal. In other words, the third signal is the second signal after full-wave rectified by the rectification unit 14.

In step S05, the modulating unit a control signal according to the result of comparing the third signal with a periodic signal. As shown in FIG. 2A, in the present embodiment, the waveform of the periodic signal is a triangular wave. At the slant region a of the waveform of the third signal, the voltage values of the waveform of the third signal are smaller than the corresponding waveform of the periodic signal at some portions. Then referring to the corresponding waveform of the control signal, outputted by the modulating unit 15 at the bottom, the modulating signal of these regions are in low levels (Low), while the modulating signal of other regions are in high levels (High).

In other words, in the present embodiment, the control signal is a pulse width modulation signal. When the voltage value of the waveform of the third signal is smaller than that of the periodic signal, the modulating unit 15 outputs a low level control signal; otherwise, when the voltage value of the waveform of the third signal is equal to or larger than that of the periodic signal, the modulating unit 15 outputs a high level control signal.

Referring to FIG. 2B, at the slant region b of the waveform of the third signal, the slope of the waveform of the third signal is larger than that of the region a in FIG. 2A. Therefore, the regions that the voltage value of the waveform of the third signal is smaller than that of the periodic signal is fewer, and the low-level regions of the control signal correspondingly outputted by the modulating unit 15 is fewer.

In step S06, the modulation unit controls the rotor to reverse its rotation according to the control signal. As shown in FIGS. 2A and 2B, when the slope of the slant region of the waveform of the third signal is larger, the soft-switching time for the modulating unit 15 to control the rotor 11 is longer, and vice versa. Therefore the effect of vibration reduction can be achieved.

To sum up, the motor and control method of the invention are to perform a modulation using the result of comparing the periodic signal with the signal obtained after offsetting and level adjusting the Hall signal, and the rotation of the rotor is controlled according to the outputted control signal. Therefore, the reverse of the rotation is smoother, and the vibration is reduced more effectively. The damages or error of the precise electronic apparatus can be avoided and the quality of the overall electronic apparatus can be improved.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present invention.

What is claimed is:

1. A motor, comprising:
   a rotor;
   a sensor unit for outputting a first signal according to a magnetic field variation of the rotor;
   an offset unit coupled to the sensor unit for outputting a second signal according to the first signal;
   a rectification unit coupled to the offset unit for outputting a third signal according to the second unit; and
   a modulating unit coupled to the rectification unit for outputting a control signal according to a result of comparing the third signal with a periodic signal, the modulating unit controlling the rotor according to the control signal whereby a rotation is reversed more smoothly.

2. The motor according to claim 1, wherein the waveform of the periodic signal is a triangular wave or a square wave.

3. The motor according to claim 1, wherein the control signal is a pulse width modulation signal.

4. The motor according to claim 1, wherein absolute values of a positive level and a negative level of the second signal are substantially the same.

5. The motor according to claim 4, wherein the rotor comprises a magnetization waveform.

6. The motor according to claim 5, wherein the magnetization waveform is substantially a sine wave.

7. The motor according to claim 1, wherein the offset unit adjusts and fixes absolute values of the positive level and the negative level of the second signal at a specific level value to smooth the waveform of the second signal.

8. The motor according to claim 1, wherein the rectification unit full-wave rectifies the second signal to output the third signal.

9. The motor according to claim 1, wherein when the voltage value of the waveform of the third signal is smaller than that of the periodic signal, the modulating unit outputs a low level control signal, and when the voltage value of the waveform of the third signal is equal to or larger than that of the periodic signal, the modulating unit outputs a high level control signal.

10. The motor according to claim 1, wherein at least two of the sensor unit, the offset unit, the rectification unit, and the modulating unit are integrated in a single chip.

11. A control method of a motor, comprising steps of:
providing a motor, the motor including a rotor, a sensor unit, an offset unit, a rectification unit and a modulating unit;
the sensor unit outputting a first signal according to a magnetic field variation of the rotor;
the offset unit adjusting a positive level and a negative level of the first signal to output a second signal;
the rectification unit full-wave rectifying the second signal to output a third signal;
the modulating unit outputting a control signal according to the result of comparing the third signal with a periodic signal; and
the modulating unit controlling the rotor according to the control signal whereby a rotation is reversed more smoothly.

12. The control method according to claim 11, wherein in the step that the offset unit adjusts the positive level and the negative level of the first signal, the offset unit checks whether the absolute values of the positive level and the negative level of the waveform of the first signal are the same; and if not, the offset unit adjusts the zero-level point of the waveform of the first signal.

13. The control method according to claim 12, wherein absolute values of a positive level and a negative level of the second signal are substantially the same.

14. The control method according to claim 13, wherein the rotor comprises a magnetization waveform.

15. The control method according to claim 14, wherein the magnetization waveform is substantially a sine wave.

16. The control method according to claim 13, wherein the offset unit adjusts and fixes absolute values of the positive level and the negative level of the second signal at a specific level value to smooth the waveform of the second signal.

17. The control method according to claim 11, wherein the control signal is a pulse width modulation signal.

18. The control method according to claim 11, wherein the waveform of the periodic signal is a triangular wave or a square wave.

19. The control method according to claim 11, wherein when the voltage value of the waveform of the third signal is smaller than that of the periodic signal, the modulating unit outputs a low level control signal, and when the voltage value of the waveform of the third signal is equal to or larger than that of the periodic signal, the modulating unit outputs a high level control signal.

20. The control method according to claim 11, wherein at least two of the sensor unit, the offset unit, the rectification unit, and the modulating unit are integrated in a single chip.

* * * * *